United States Patent [19]

Thompson

[11] Patent Number: 4,563,980
[45] Date of Patent: Jan. 14, 1986

[54] MARKING DEVICE FOR USE WITH AN ANIMAL MARKING HARNESS

[75] Inventor: Edward Thompson, Mt. Waverley, Australia

[73] Assignee: Hortico Limited, Laverton North, Australia

[21] Appl. No.: 519,802

[22] Filed: Aug. 3, 1983

[30] Foreign Application Priority Data

Aug. 16, 1982 [AU] Australia .................. PF5412

[51] Int. Cl.[4] ............ A01K 45/00; A01K 67/00
[52] U.S. Cl. ........................ 119/1; 40/11 A
[58] Field of Search ............ 40/11 A; 119/1, 109; 248/362; 24/573; 403/329, 109; 128/738; D30/43; 54/1

[56] References Cited

U.S. PATENT DOCUMENTS

| | | |
|---|---|---|
| 1,237,983 | 8/1917 | Werner ............... 119/1 |
| 1,597,786 | 8/1926 | Hamel ............... 248/362 |
| 2,266,643 | 12/1941 | Kruse ............... 403/329 |
| 2,487,557 | 11/1949 | Jourgensen ............... 40/11 A |
| 2,678,022 | 5/1954 | Jourgensen ............... 119/1 |
| 3,603,291 | 9/1971 | Baker ............... 119/1 |
| 3,695,646 | 10/1972 | Mommsen ............... 24/573 |

Primary Examiner—Gene Mancene
Assistant Examiner—James Hakomaki
Attorney, Agent, or Firm—Karl W. Flocks; Sheridan Neimark; A. Fred Starobin

[57] ABSTRACT

An improved marking device for use with an animal harness to provide a means for identifying mated animals by color code. A replaceable marking device such as a marker block of colored crayon is secured to the animal harness by a snap fitted retaining means thus providing for safe, quick and easy replacement of spent markers.

4 Claims, 3 Drawing Figures

MARKING DEVICE FOR USE WITH AN ANIMAL MARKING HARNESS

The invention relates to an improved marking device for use with an animal marking harness. The invention is particularly, although not exclusively applicable to the marking device of a livestock marking harness, such as for example as may be fitted to a ram or bull. It will however be convenient to hereinafter describe the invention with reference to a ram harness.

In the interest of good farm management of breeding flocks, the ram harness was developed to provide a means for identifying by colour code, those ewes which had mated with a particular ram. Such harnesses when fitted to the ram support a marking device, usually in the form of a marking crayon (which in the trade is often called a "raddle") which carries the ram's colour code. The marking device is positioned on the harness so as to be situated on the breast of the ram so that during mating the colour from the device is rubbed onto the ewe's back. A breeder is thus able at a later date to determine whether a ewe has mated, and with which ram.

In conventional harnesses to date difficulties occur in the fitting of a marking crayon. Until now a cotter pin was passed through the marking crayon and the harness, then spread, to hold the crayon onto the harness. A problem arises when insufficient care is exercised to ensure that the spread tips of the pin are correctly fashioned or positioned with respect to the harness. Thus the sharp tips can inflict wounds, which may ultimately infect, on the forelegs of the ram and/or on the ewes.

Particular difficulty occurs where one wishes to replace a spent marking crayon while the ram is fitted with the harness. To achieve this the ram is usually sat on its haunches and while trying to hold the ram in that position, one endeavours to grip the spread tips of the cotter pin and compress them together with a pair of hand pliers, so that the cotter pin can then be removed to allow the marking crayon to separate from the harness. Insertion of a new marking crayon then requires alignment of holes to allow a new cotter pin supplied with the new crayon to be inserted and then split to secure the new crayon to the harness. It has been found that this procedure often requires two persons to effect a marking crayon replacement in that it is difficult for one person to capture and compress the spread tips of the cotter pin so as to remove the pin and crayon while trying to hold the ram on its haunches.

It is an object of the present invention to provide an improved marking device which is of a relatively simple and economic construction and which is effective in use. A further object is to provide such a device which will allow for quick and easy replacement of a spent marking cartridge and which when so fitted will not inflict wounds to the ram and/or ewe.

According to the present invention there is provided a marking device including a replaceable cartridge member incorporating a working member to apply the marking, a cartridge carrier to receive said replaceable cartridge member and a releasable retaining means comprising at least one yieldably urged retaining projection to retain said replaceable cartridge member in said cartridge carrier.

The marking device according to the present invention includes a replaceable cartridge member. In a preferred construction, the replaceable cartridge member comprises a working member, adapted to apply the marking, supported on a support member.

Preferably the support member comprises a substantially rectangular base member having a pair of longitudinal oppositely disposed upwardly extending side walls. In this preferred construction, the support member is in the form of a substantially channel shaped member for example an open-ended tray.

More preferably the replaceable cartridge member is wedge shaped with the side walls and the associated sides of the base member converge towards one end of the base member (hereinafter termed "the front end of the replaceable cartridge member"). Thus at least one of the side walls and sides of the base member will lie at an obtuse angle rather than at a right angle to the front end of the base member.

Each side wall preferably contains a hole through which the cartridge member can be secured to the harness. Preferably in both preferred forms of the support member described above, the holes are opposed to one another. For example, each hole is positioned mid-way the length and height of the wall.

The working member is preferably made from crayon or other solid marking substance. However, sponge or like substances adapted to provide controlled release of a marking liquid may be used.

Preferably the working member is of a complementary shape to the support member so that it is locatable and readily securable therein. Preferably the working member is of uniform depth throughout its length, which depth is greater than the height of the side walls of the support member to enable the working member to apply the marking to a ewe.

Those side walls of the working member which in use are substantially parallel with the side walls of the support member may also contain holes which in use align with the holes in the support member. This assists in securing the cartridge member when fitted to the harness.

The working member is most preferably in the form of a solid crayon block which will hereinafter be described. The crayon can be attached to the support member of the replaceable cartridge member by means common in the art, for example by moulding the crayon into the support member.

The marking device of the present invention also includes a cartridge carrier. In a preferred construction the cartridge carrier comprises a cartridge carrier body member. Preferably the body member comprises a substantially rectangular base member having a pair of longitudinal oppositely disposed upwardly extending side walls. Accordingly, the body member is preferably in the form of a substantially channel shaped member, for example an open-ended tray.

More preferably, as with the cartridge member, the side walls and the sides of the base member of the cartridge carrier body member converge towards one end of its base member (hereinafter termed "the front end of the cartridge carrier body member").

Each side wall of the cartridge carrier preferably contains a hole through which the replaceable cartridge support member can be secured within the carrier. Preferably in both preferred forms of the cartridge carrier the holes are opposed to one another. For example, each hole is positioned mid-way the length and height of the wall.

Preferably the cartridge carrier is shaped to accommodate the support member of the replaceable cartridge member. Accordingly both the replaceable cartridge member and the cartridge carrier can be complementary in form so the support member can rest within the carrier. However, in another form the cartridge carrier can be substantially rectangular while the replaceable cartridge member is tapered as discussed above, provided the replaceable cartridge member can be located and secured within the cartridge carrier.

In a preferred construction both the support member of the replaceable cartridge member and the body member of the cartridge carrier are tapered, such that when the front-end of the replaceable cartridge member is inserted into the cartridge carrier it can be slid forward on and toward the front-end of the cartridge carrier with the respective side walls of each member parallel until they frictionally wedge with one another to assist in holding the replaceable cartridge member within the cartridge carrier.

The cartridge carrier may also be provided with a stop member adapted to prevent the replaceable cartridge member when inserted into the cartridge carrier from one end thereof passing completely through the cartridge carrier. The location of the stop member can also be used to assist in aligning the holes of the cartridge carrier with corresponding holes of the replaceable cartridge member for securing the replaceable cartridge member.

Preferably the stop member is located at the front-end of the cartridge carrier and is in the form of a wall extending upwardly with respect to the base member and laterally between the pair of longitudinal oppositely disposed upwardly extending side walls of the cartridge support member. Preferably the wall is formed by rolling a flange which extends outwardly from the front-end of the base member of the cartridge carrier into tubular form. Preferably the flange is rolled first downwardly and then rearwardly towards the body of the carrier.

The cartridge carrier can be secured to the ram marking harness by the usual methods in the art, for example by riveting its base member to the harness.

The marking device for the present invention also includes a releasable retaining means comprising at least one yieldably urged retaining projection adapted to retain the replaceable cartridge member in the cartridge carrier.

The at least one yieldably urged retaining projection is shaped to engage with an associated hole in the replaceable cartridge member and within the corresponding hole of the cartridge carrier so as to hold the replaceable cartridge member in the cartridge carrier. The at least one projection is releasably urged into such engagement by a force such that when sufficient pressure is applied to the projection it will disengage the hole of the replaceable cartridge member to allow its subsequent removal from the cartridge carrier.

Preferably the marking device is provided with two such projection members which are adapted to protrude through the holes on either side wall of the cartridge carrier and to engage and hold a replaceable cartridge member suitably located therein.

Each projection preferably extends from the free end of a flexible arm mounted on the cartridge carrier in such a manner that the projection normally extends through its associated hole in the cartridge carrier but may be forced out of the hole against the flexible resistance of the arm.

In a preferred form the retaining means is a substantially U-shaped clip having inwardly directed free ends which ends provide the projections. The base of the U-shaped clip may be secured to, or pivotally mounted on, the cartridge carrier so that one arm extends along each side of the cartridge carrier. Preferably the base of the substantially U-shaped clip is located in the rolled flange stop member whereby the clip may be pivoted about the axis of the stop member to assist location of its free ends in the holes of the appropriate side walls of the cartridge carrier and the replaceable cartridge member.

When the base of the substantially U-shaped clip is so located in the rolled flange stop member and where one of the free ends protrudes through its hole in the cartridge carrier, the clip is so tensioned that the other free end is biased to protrude through the other hole of the opposed side wall of the carrier. Due to this tension effect, it has been found that if one of the free ends is accidentally dislodged from its appropriate hole in the carrier, it will automatically re-engage that hole and the corresponding hole in the replaceable cartridge member.

To assist in this automatic re-engagement aspect, the arms of the substantially U-shaped clip, rather than extending in a straight line from their pivotal mounting to the associated hole in the side wall of the carrier, may be curved toward the base of the cartridge carrier. In this configuration displacement of an arm towards the base of the carrier will be resisted by the curved arm meeting the harness to which the carrier is attached.

In a further preferred form the retaining means may comprise two separate flexible arms with inwardly projecting free ends, each arm being mounted on the outside of an opposite side wall of the cartridge carrier. Each such flexible arm may be secured to its respective side wall such that one end is fixed to the wall while the other, free, end protrudes through the appropriate hole in the side wall. Preferably each such arm is curved as described in the preceding paragraph.

The marking device of the present invention may be formed of any suitable material including steel, galvanised steel, aluminium, plastics or a combination thereof of suitable strength, thickness and/or size.

It has been found with the marking device according to the present invention that the replacement of the replaceable cartridge member can be achieved in a greatly reduced time as compared with the previous method as one need only force the retaining means to disengage the holes in the replaceable cartridge to allow the cartridge to be slidably removed. It has been found that the force required to disengage the retaining means can be achieved by merely using one's fingers to remove the free ends of the retaining means out of engagement with the replaceable cartridge member.

Further the present invention appears to have eliminated the previous disadvantage found with the cotter pin namely inflicting wounds to the forelegs of rams and/or on the ewes, as the possibly sharp free ends of the retaining means are captive in the replaceable cartridge member. The device of the present invention has also made it unnecessary to fit a new cotter pin with each replaceable cartridge member. The improved carrier of the present invention may be fitted to replace the carrier on an existing form of harness and the existing replaceable cartridge members for example marking crayons, may be used in the improved carrier.

An embodiment of the present invention is illustrated in the accompanying diagrammatic drawings in which.

Figure 1:
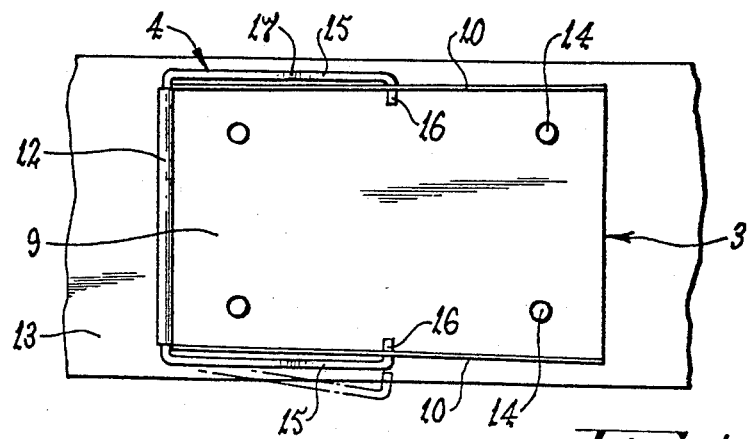
FIG. 1 is a top plan view of the cartridge carrier incorporating a releasable retaining means and in which the carrier is secured to a harness strap.
Figure 2:
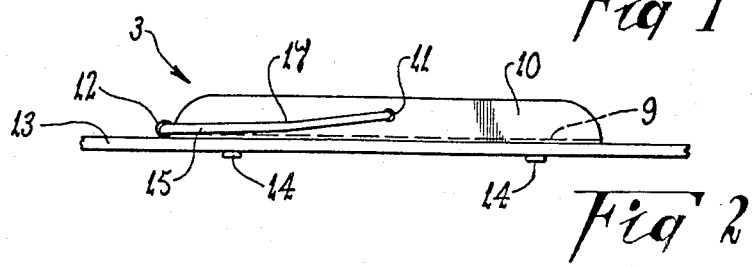
FIG. 2 is a side view of the cartridge carrier and releasable retaining means as shown in FIG. 1.

In the embodiment described in the Figures there is provided a marking device 1 including a replaceable cartridge member 2, a cartridge carrier 3 and a releasable retaining means 4 adapted to retain the replaceable cartridge member 2 in the cartridge carrier 3.

The replaceable cartridge member 2 comprises a working member 5 adapted to apply the marking in use, and supported on a support member 6. The support member comprises a wedge shaped base member (not shown) having a pair of longitudinal oppositely disposed upwardly extending side walls (one shown) 7 with aperture 8 for receiving the releasable retaining means 4 in a manner hereinafter described.

Figure 3:
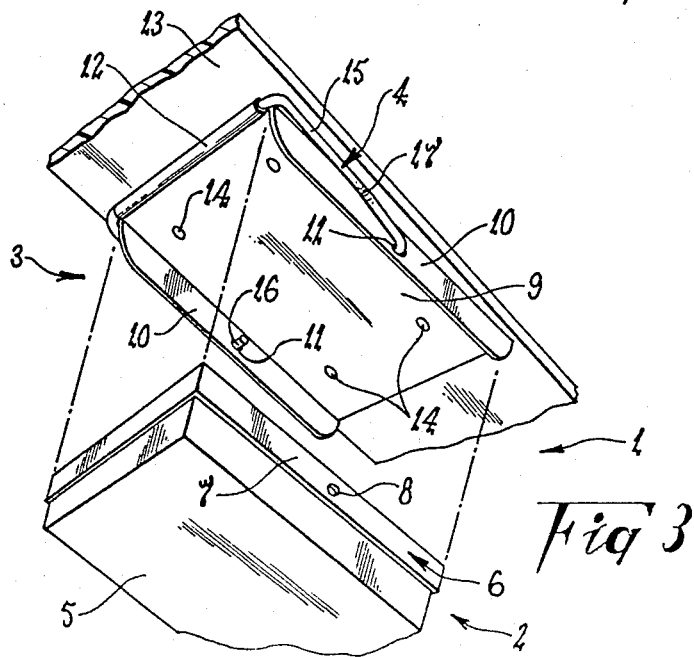
FIG. 3 is an exploded view of the cartridge carrier and releasable retaining means of FIG. 1 in association with a replaceable cartridge member.

The working member 5 is a solid block of crayon and is of complementary shape to the support member 6 which in FIG. 3 is depicted as a tray. The working member is of uniform depth throughout, which depth is greater than the height of the side walls 7 of the support member 6. The working member 5 has apertures (not shown) which correspond with apertures 8 in the support means.

The cartridge carrier 3 comprises a wedge shaped base member 9 having a pair of longitudinal oppositely disposed upwardly extending side walls 10. Each side wall 10 is provided with an aperture 11 through which the replaceable cartridge member 2 can be secured to the cartridge carrier 3.

In the Figures the replaceable cartridge member 2 and the cartridge carrier 3 are of complementary configuration.

The cartridge carrier 3 is also provided with a stop member 12 adapted to prevent the replaceable cartridge member 2 from sliding through the cartridge carrier when inserted therein.

The stop member 12 is located at the front or wedged end of the cartridge carrier 3 and is in the form of a flange rolled into a tube.

The cartridge carrier 3 is secured to the ram marking harness 13 by riveting 14 the base member 9 to the harness 13.

The replaceable cartridge member 2 is releasably secured in the cartridge carrier 3 by a releasable retaining means 4. The releasable retaining means 4 is a substantially U-shaped clip comprising a base portion pivotally mounted within stop member 12, and a pair of flexible arms 15 which in use are located along the outside of the side walls 10 of the cartridge carrier 3. The distal or free ends of the flexible arm 15 are provided with projection members 16 adapted to protrude through apertures 11 and 8 of the cartridge carrier 3 and replaceable cartridge member 2 respectively when the cartridge member 2 is located in the cartridge carrier 3.

The flexible arms 15 of the releasable retaining means 4 are curved 17 to assist in automatically relocating the projection members 16 if accidentally dislodged during use.

In use the spent marking cartridge is removed from the cartridge carrier by disengaging the retaining projection(s) from the aperture(s) in the side walls of the cartridge member and cartridge carrier. The cartridge member may then be lifted or slid out from the cartridge carrier.

To insert a fresh marking cartridge member the reverse procedure may be followed i.e. a fresh marking cartridge member may be placed or slid into position in the cartridge carrier until the retaining projection(s) are located in the aperture(s).

In the preferred embodiments of the invention where either or both of the side walls of the cartridge member and carrier are tapered, the retaining projection(s) may be relocated in the aperture(s) of the cartridge carrier before insertion of the cartridge member. As the cartridge member is slid into the cartridge carrier the retaining projection(s) is/are laterally displaced until the apertures of the cartridge carrier and member are aligned. The retaining projection(s) will then automatically pass through the apertures in the side walls of the cartridge carrier and member thus securing the cartridge member.

As stated earlier, the invention has been conveniently described with reference to sheep where the marking device was described as being positioned on the harness so as to be situated on the breast of a ram. It will be appreciated that when dealing with bovine species the marking device should be positioned on the harness so as to be situated on the chin of a bull so that during mating the colour from the device will be transferred to the back of a cow.

Finally it is to be understood that there are alterations, modifications and/or additions that may be introduced into the construction and arrangement of parts previously described without departing from the spirit or ambit of the invention.

What I claim is:

1. An animal marking device for incorporation into a harness worn by an animal, usually a male animal, comprising
   a cartridge carrier having a base member attached to the harness and having a pair of longitudinally opposed upwardly extending side walls at least one of which is provided with an aperture therethrough;
   a replaceable cartridge member adapted to fit on said base member between said upwardly extending side walls;
   a releasable retaining means to hold said replaceable cartridge member on said base member and having at least one yieldably resilient arm connected to said base member and contacting said replaceable cartridge member through said aperture in at least one of said side walls of said base member with said resilient arm extending from said aperture below the height of said upwardly extending sidewalls;
   said replaceable cartridge member having a hole on at least one side located to coincide with said aperture in said side wall when said replaceable cartridge member is in place on said base member and with said hole located to receive an end of said yieldably resilient arm extending through said aperture into said hole.

2. The animal marking device of claim 1 further characterized by
   a stop member extending laterally at least part of the distance between said side walls and formed as a folded over portion of said base member;
   said releasable retaining means being a substantially U shaped member having a said yieldably resilient arm extending from each side of a base of said U shaped member toward a said aperture in each of said side walls of said base member;

said base of said U shaped member extending through said folded over portion and held by said folded over portion of said base member;

said replaceable cartridge member having a said hole to coincide with each of said apertures in said side walls to receive an end of said yieldably resilient arm on opposite ends of said U shaped member.

3. The animal marking device of claim 2 further characterized by said replaceable cartridge member sides containing said holes formed sloping away from each other in a direction to spread said ends of said U shaped member as said replaceable cartridge member is moved into place on said base member in a direction toward and against said stop member.

4. The animal working device of claim 3 further characterized by said U shaped member having said yieldably resilient arms extending from the base of the U shaped member along the base of said base member and then curving upward along said side walls toward said apertures in said side walls.

* * * * *